United States Patent [19]

Christner et al.

[11] Patent Number: 4,822,054
[45] Date of Patent: Apr. 18, 1989

[54] VAPOR/FUEL SEAL FOR FUEL TANK FILLER TUBE

[75] Inventors: Susan A. Christner; Elaine R. Janda, Both of Wyandotte; Mark Sidebottom, Fenton, all of Mich.

[73] Assignee: Janchris Corporation, Wyandotte, Mich.

[21] Appl. No.: 144,911

[22] Filed: Jan. 15, 1988

[51] Int. Cl.⁴ .............................................. F16J 15/32
[52] U.S. Cl. ..................... 277/12; 277/207 A; 141/312; 141/314; 141/331
[58] Field of Search ............... 277/12, 212 F, 207 A, 277/DIG. 2; 220/85 VR, 85 VS, 86 R, 110; 141/286, 285, 301, 311, 312, 313, 314, 350, 331, 366, 368, 388, 389, 392

[56] References Cited

U.S. PATENT DOCUMENTS

| | | | |
|---|---|---|---|
| 2,703,194 | 3/1955 | White | 141/389 |
| 3,495,594 | 2/1970 | Swanson | 141/330 |
| 3,566,928 | 3/1971 | Hansel | 141/392 |
| 3,734,149 | 5/1973 | Hansel | 141/285 |
| 3,903,942 | 9/1975 | Vest | 277/207 A |
| 4,037,754 | 7/1977 | Wilhelmi et al. | 141/350 |
| 4,630,749 | 12/1986 | Armstrong et al. | 220/85 VR |

*Primary Examiner*—William A. Cuchlinski, Jr.
*Assistant Examiner*—Petar Arsenovic
*Attorney, Agent, or Firm*—Basile, Hanlon

[57] ABSTRACT

A vapor/fuel seal for a fuel tank filler tube. The vapor/fuel seal includes an expansible seal member having inlet and outlet ends. The inlet end is sealingly mountable on the inlet end of a vehicle filler tube. The outlet end is normally closed. However, the outlet end is expansible to receive the end of a fuel dispensing nozzle therethrough. Intermediate between the inlet and outlet ends of the seal member is a sleeve member which defines an expansible fluid flow body portion. The sleeve member is expansible to receive a fluid dispensing nozzle and yet remain in sealing contact with the periphery of the nozzle. The vapor/fuel seal has a biasing member monted at the inlet end and extending into the fluid flow body portion to maintain the expansible seal member in position during insertion and removal of the fluid dispensing nozzle. The biasing member has at least two prong members which extend within the fluid flow passage and maintain the sleeve member in position during insertion and retraction.

5 Claims, 1 Drawing Sheet

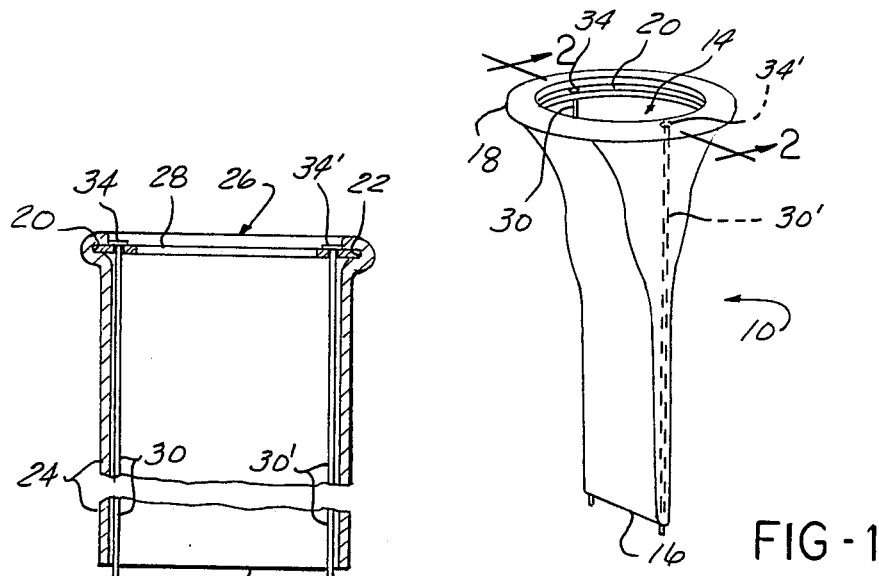
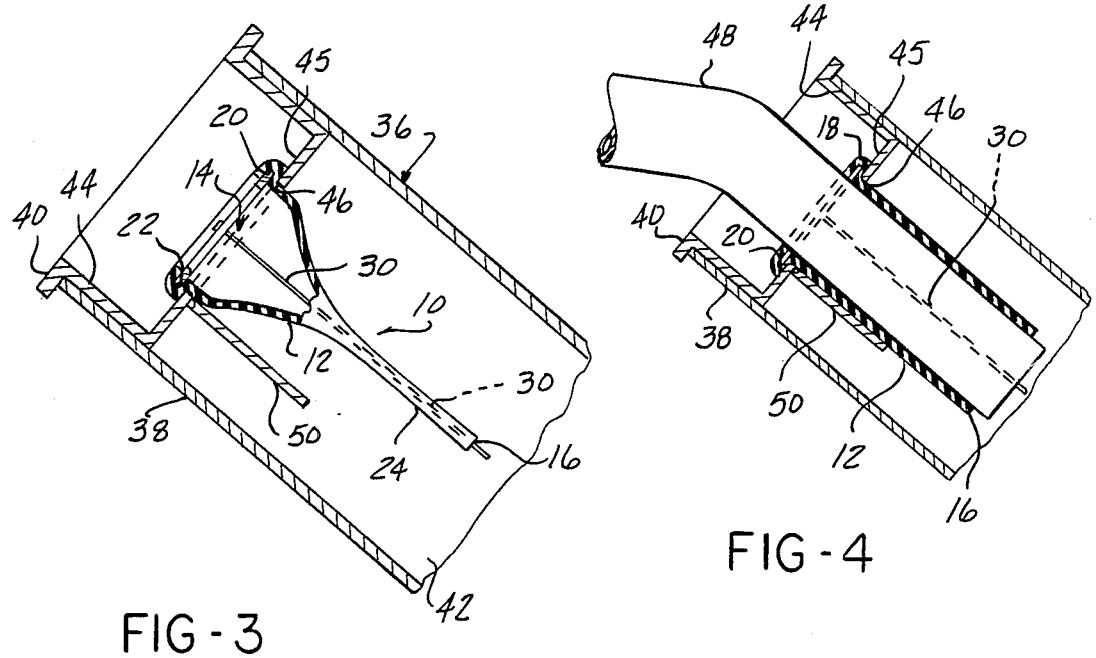

VAPOR/FUEL SEAL FOR FUEL TANK FILLER TUBE

BACKGROUND OF THE INVENTION

1. Field of the Invention

This invention relates, in general, to motor vehicle fuel systems and, more specifically, to vapor and/or fuel seals for motor vehicle fuel systems.

2. Description of the Prior Art

In order to operate motor vehicles having internal combustion engines, such as automobiles, boats, airplanes, etc., the vehicle must have a steady supply of a combustible fuel such as gasoline, kerosene, diesel fuel, etc. typically, this fuel is stored in an on-board storage tank. The fuel can be introduced into the tank present on such vehicles from a supply reservoir through a dispensing nozzle.

As is readily appreciated, the fuels necessary to effectively operate internal combustion engines are generally present as liquids. However, these fuels are highly volatile and produce a significant amount of gaseous vapors at ambient temperatures. Transfer of engine fuel from supply reservoirs to the on-board storage tanks permits escape of some of the volatile vapors, allowing them to be introduced into the atmosphere. Such vapors contribute to the pollution of the overall atmosphere and, also, may cause harmful effects on the person dispensing the fuel if inhaled.

As can readily be appreciated, the fuels, whether in a gaseous or liquid state, are highly flammable. The potential exists for easy ignition of the vapor portion of these fuels if that portion is brought into contact with a flame or hot surface. This can potentially cause a vapor flashback, igniting larger liquid portions of the fuel in the reservoirs or on-board storage tank.

Furthermore, engine fuels are generally dispensed from a supply reservoir through a dispensing nozzle inserted into a filler inlet located in or connected to the on-board storage tank. Because the fuel is introduced at a relatively rapid rate, there exists a danger that the storage tank may overflow through the inlet opening and connected filler tube if the tank is overfilled. Additionally, certain tank configurations can also cause "burping"; a condition whereby small portions of the liquid fuel are expelled back through the filler tube and on-board storage tank inlet due to the presence of trapped air in the on-board storage tank. This expelled fuel can potentially get on operator's hands, be spilled down the side of a car marring its paint, and spill on to the ground, either contaminating the ground or evaporating and contributing to air pollution.

Efforts have been made to prevent the discharge of such vapors or liquid fuel into the environment by providing various seals which prevent the escape of engine fuel vapors. Typically, such sealing means are flexible caps attached to the dispensing nozzle of a storage tank. The flexible cap covers the end of the filler tube on the vehicle when the dispensing nozzle is inserted therein. While reducing the amount of vapors introduced into the atmosphere during the fuel transfer process, such sealing methods do not provide complete sealing of the filler tube. Even with these measures, significant amounts of fuel vapors still escape during the filling process. Furthermore, such sealing means do not prevent the escape of liquid fuel from the filler tube if the tank is inadvertently overfilled or filled at too fast a rate.

Various other types of vapor seals for fluid transfer processes are also known. In U.S. Pat. No. 3,903,942, an adaptor is mounted within the filler tube on a vehicle. The adaptor expands to sealingly receive the discharge end of the dispensing nozzle, preventing the escape of vapors from the vehicle tank during the fuel transfer process. This adaptor is provided with open inlet and outlet ends such that, when the adaptor is not being used for the introduction of fuel into the tank, the passage between the inlet and outlet remains open thereby allowing the escape of vapors and/or liquid fuel from the vehicle tank into the atmosphere upon removal of the filler tube cap.

Thus, it would be desirable to provide a vapor/fuel seal for a vehicle fuel filler tube which completely seals the inlet to the filler tube during use of the vehicle and, provides a seal when a dispensing nozzle from a storage tank is introduced into the filler tube during the transfer of fuel. It would also be desirable to provide a vapor/fuel seal for a fuel tank filler tube which may be easily installed on new and existing vehicles to provide the desired vapor and fuel sealing features described above.

SUMMARY OF THE INVENTION

The present invention is a vapor/fuel seal for a vehicle fuel tank filler tube which is composed of an expansible seal member adapted to be mounted on the inlet end of the vehicle filler tube. The seal member has an inlet end and an outlet end. The inlet end of the seal member is sealingly mountable over the inlet of the vehicle filler tube. The outlet end of the seal member is sealingly closed in its normal state to prevent the escape of fuel vapors and/or liquid fuel from the filler tube.

A biasing member is securely positioned at the inlet end of the seal member. The biasing member has a lateral portion which can be affixed to or mounted on the inlet end of the seal member and at least two prong members extending outward therefrom. The prong members extend along the interior of a fluid flow passage defined by the seal member. The fluid flow passage, formed from an expansible material, is closingly sealed from the outlet end to a point medial between the inlet and outlet ends when in its normal position.

BRIEF DESCRIPTION OF THE DRAWING

The various features, advantages and other uses of the present invention will become more apparent by referring to the following detailed description and drawings in which:

FIG. 1 is a perspective view of the vapor seal of the present invention;

FIG. 2 is a cross-sectional view of the vapor seal of the present invention taken along the 2—2 line of FIG. 1;

FIG. 3 is a cross-sectional view of the installation of the vapor seal of the present invention in a conventional vehicle filler tank; and FIG. 4 is an enlarged cross-sectional view showing the insertion of a nozzle into the vapor seal of the present invention mounted within the filler tube of a motor vehicle.

DESCRIPTION OF THE PREFERRED EMBODIMENT

Throughout the following description and drawings, an identical reference number is used to refer to the same component shown in multiple figures of the drawing.

As shown in the drawing, and in particular in FIG. 1, there is illustrated a vapor/fuel seal 10 which prevents the escape of vapors and/or liquid fuel from the fuel tank of a vehicle having an internal combustion engine, such as an automobile, boat, airplane, etc., during the use of the vehicle as well as during the transfer of fuel from a storage tank to the on-board vehicle fuel tank. The seal member 10 is in the form of an elongated body 12 having an inlet end 14 and an outlet end 16. The elongate body 12 is formed of any suitable material which is impervious to the corrosive effects of gasoline, diesel fuel or their additives and is capable of providing long-term use on a vehicle. Examples of such materials include various rubbers as well as suitable plastics such as polypropylene, polyvinylchloride, etc. which provide the desired degree of expansability to permit the introduction of the dispenser nozzle therethrough as well as providing a complete seal when the nozzle is removed from the interior of the elongate body 12 of the seal member 10.

At the inlet end 14 of the seal member 10, there is formed a first annular ring 18 constructed solely from rubber, or a polymeric plastic having a sufficient degree of strength and durability as well as non-deformability to maintain the shape of the annular ring 18. Alternately, the annular ring 18 can have separate flange member 20 which can be constructed of any suitable metal or durable, non-deformable plastic surrounded by a lip 22 as shown in FIG. 2. When a separate flange 20 is used, the expansible material of the elongate body 12 immediately adjacent the inlet end 14 is attached to the flange in a manner which surrounds at least two sides of the flange 20. Attachment can be by any suitable adhesive or by in-place molding. In the preferred embodiment, the uppermost end of the elongate body 12 defines the lip 22 into which the flange 20 is permanently held.

The elongate body 12 has a generally tapering shape when viewed along the plane P1. The taper extends from the lower interior portion of the annular ring 18 to the outlet end 16 to form a sleeve member 24. As shown in FIG. 3, the sleeve member 24 is, preferably, configured to permit the walls of the sleeve member to contact each other from the outlet end 16 to a point midway between the outlet end 16 and the inlet end 14. This inward tapering form between inlet end 14 and outlet end 16 as shown in FIGS. 1 and 3 ensures the releasable sealing of the inner walls of the sleeve member 24.

The seal member 10 of the present invention also has a biasing member 26 which is fixedly positioned or attached at the inlet end 14. The biasing member 26 has a lateral portion 28 and two prong members 30, 30' extending therefrom. In the preferred embodiment, the lateral portion 28 is fixedly secured to the annular ring 18 of the vapor/fuel seal 10. The prong members 30, 30' extend perpendicularly from the lateral portion 28 into the interior of the elongate body 12. The prong members 30, 30' can either be positioned parallel to one another, or can extend angularly outward from their point of attachment to the lateral portion 28.

As can be seen in FIG. 2, the sleeve member 24 of the elongate body 12 is stretched between the two prong members 30, 30'. Thus, when viewed from the plane P2, the elongate body has little tapering due, in part, to the presence of prong members 30, 30'.

In the preferred embodiment, the inlet end 14 generally defines a circular opening 32. The lateral portion 28 is generally semi-circular and configured to rest on, or be attached to, the inlet end 14. The prong members 30, 30' are positioned at either end of the lateral portion 28. In the preferred embodiment, the lateral portion is of sufficient size to permit the prong members to diametrically oppose one another as they extend into the interior of the elongate body.

The lateral portion 28 of biasing member 26 generally overlays the inlet end 14 and is oriented such that the prong members 30, 30' extend through associated apertures 34, 34' located in the inlet 14 into the interior of the elongated body 12. When fuel is not being transferred, this configuration permits the lower portion of the elongate body 12 adjacent to the outlet end 16 to close around the prong members 30, 30' to seal the outlet end 16.

As shown in FIG. 3, the inlet end 14 of the fuel/vapor seal 10 is adapted to fit over and mount the seal member 10 on the exterior of the inlet end of a conventional vehicle filler tube or neck 36. The filler tube 36 includes an outer tube 38 having an inlet end 40 and an outlet end 42. An interior cap member 44 is mounted at the inlet end 40. The interior cap member 44 includes a centrally located aperture 46 for receiving the dispensing nozzle 48 of a fuel transfer system as described in greater detail hereafter and shown in detail in FIG. 4. The aperture 46 is normally closed by a spring-biased cover 50 which moves to an open position, clearing the aperture 46, when the seal member 10 is mounted on the filler tube 36.

As can be seen in FIG. 3, the interior cap member 44 has a laterally extending shelf 45 immediately adjacent to the centrally located aperture 46. The inlet end 14 of the vapor seal 10 of the present invention is adapted to rest on the shelf 45 while the elongate body 12 extends through the aperture 46 into the interior of the space defined by the outer tube 38. In the preferred embodiment, the vapor seal 10 has the flange 20 and the upper lip 22 positioned at the inlet end 14. When in position, elastomeric material forming the upper lip 22 and sleeve member 24 is sandwiched between the shelf 45 and the flange 20 to permit sealing engagement between the vapor seal and the interior cap member 44.

When a dispensing nozzle 48, as shown in FIG. 4, is introduced into the filler tube 36 to allow the transfer of additional quantities of fuel into the vehicle fuel tank, the outer end of the discharge nozzle 48 passes through the inlet end 14 of the vapor seal 10 and is forced through the elongate body 12 forcing the walls of the sleeve member 24 to expand outward yet continue to provide a complete sealing contact with the exterior periphery of the discharge nozzle 48. This maintains a constant seal between the vehicle fuel tank, the filler tube 36 and the outside atmosphere to prevent the escape of fuel vapors and/or liquid fuel from the tank. While the dispensing nozzle 48 is in position, the prong members 30, 30' are maintained in contact between the outside periphery of the dispensing nozzle 48 and the interior of the walls of the sleeve member 24.

When the dispensing nozzle 48 is withdrawn, the prong members 30, 30' maintain the surrounding sleeve member in position and prevent its prolapse through the inlet end 14 while permitting the sleeve member to re-seal on itself.

As was discussed previously, the prong members 30, 30' can either be oriented parallel to one another or can extend outward from their point of attachment to the lateral portion 28. In the later orientation, the insertion of the dispensing nozzle 48 will urge the prong members 30, 30' into a more parallel orientation as the sleeve member is expanded. Removal of the dispensing nozzle 48 permits the outwardly extending prong members 30, 30' to resume their normal position. This resumption of the normal angularly outwardly extending position helps to ensure that the sleeve member seals upon itself.

In summary, there has been disclosed a unique vapor/fuel seal for a vehicle tank which provides a seal which prevents the escape of vapors and/or liquid fuel from the fuel tank during the use of the vehicle, as well as during any re-fueling processes when a discharge or dispensing nozzle from an exterior fuel source is introduced into the filler tube of the vehicle to add additional quantities of fuel to the on-board vehicle fuel tank. The vapor seal of the present invention permits easy insertion and removal of the nozzle. The vapor/fuel seal of the present invention is also of economical construction and may be added to new as well as existing fuel tanks.

We claim:

1. A vapor/fuel seal for a fuel tank filler tube having inlet and outlet ends comprising:
   a seal member having an inlet end and an outlet end;
   means, formed adjacent to the inlet of the seal member, for sealingly attaching the inlet end of the seal member to the open end of the fuel filler tube;
   a normally closed fluid flow passage formed between the inlet and outlet ends of the seal member, the fluid flow passage being formed from an expansible material to enable the fuel flow passage to closingly receive a fuel dispensing nozzle; wherein the expansible material, in its normal position, seals the passage from a point medial to the inlet and the outlet to the outlet end of the seal member;
   a biasing member having a lateral portion and at least two prong members extending outward therefrom, the lateral member securely positioned at the inlet end of the seal member, the prong members extending within the fluid flow passage.

2. The vapor/fuel seal of claim 1 wherein the biasing member is made of a flexible metal.

3. The vapor/fuel seal of claim 1 wherein the inlet end of the seal member surroundingly receives the lateral portion of the biasing member.

4. The vapor/fuel seal of claim 1 wherein the inlet end of the seal member is essentially circular and the outwardly extending prongs are positioned parallel to each other and perpendicular to the lateral portion, the prongs being diametrically opposed to one another.

5. The vapor/fuel seal of claim 1 wherein the inlet end of the seal member is essentially circular and the outwardly extending prongs are positioned at diametrically opposed positions relative to the inlet end, the prongs oriented such that they extend radially outward to a location greater than the periphery defined by the inlet end of the seal member.

* * * * *